(12) United States Patent
Sieve et al.

(10) Patent No.: US 11,524,539 B2
(45) Date of Patent: Dec. 13, 2022

(54) CHASSIS COMPONENT FOR A WHEEL SUSPENSION AND METHOD FOR PRODUCING A CHASSIS COMPONENT

(71) Applicant: ZF Friedrichshafen AG, Friedrichshafen (DE)

(72) Inventors: Manfred Sieve, Lohne (DE); Philipp Bronswick, Ostercappeln (DE); Jan Pabst, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/269,043

(22) PCT Filed: Sep. 16, 2019

(86) PCT No.: PCT/EP2019/074638
§ 371 (c)(1),
(2) Date: Feb. 17, 2021

(87) PCT Pub. No.: WO2020/078630
PCT Pub. Date: Apr. 23, 2020

(65) Prior Publication Data
US 2021/0323366 A1    Oct. 21, 2021

(30) Foreign Application Priority Data

Oct. 15, 2018  (DE) ..................... 10 2018 217 642.6

(51) Int. Cl.
*B60G 7/00* (2006.01)
(52) U.S. Cl.
CPC ............. *B60G 7/001* (2013.01); *B60G 7/005* (2013.01); *B60G 2204/116* (2013.01);
(Continued)

(58) Field of Classification Search
CPC .. B60G 7/001; B60G 7/005; B60G 2204/116; B60G 2204/14; B60G 2204/416;
(Continued)

(56) References Cited

U.S. PATENT DOCUMENTS

| 3,121,348 A | 2/1964 | Reed |
| 7,695,212 B2 | 4/2010 | Spratte et al. |

(Continued)

FOREIGN PATENT DOCUMENTS

| CN | 106739895 A | * 5/2017 |
| CN | 110497755 A | * 11/2019 |

(Continued)

OTHER PUBLICATIONS

International Search Report Corresponding to PCT/EP2019/074638 dated Dec. 16, 2019.

(Continued)

*Primary Examiner* — Paul N Dickson
*Assistant Examiner* — Matthew D Lee
(74) *Attorney, Agent, or Firm* — Finch & Maloney PLLC (57) ABSTRACT

A chassis component for a wheel suspension which has a strut arrangement with at least one strut which is in the form of a profile component with an open cross-section. The at least one strut has a profile base and two wall sections that extend away from the profile base. An articulation point is provided, at least at one end of the strut, for receiving two joint components movably connected to one another, namely, a first joint component having a spherical joint body and a second joint component that rotatably and/or pivotably holds the joint body. In the area of the at least one articulation point, the wall sections have first and second joint accommodation apertures arranged opposite one another. A cylindrical sleeve is pressed in between the first joint accommodation aperture and the second joint accommodation (Continued)

aperture and keeps the opposite wall sections apart from one another.

14 Claims, 8 Drawing Sheets

(52) U.S. Cl.
CPC .... *B60G 2204/14* (2013.01); *B60G 2204/416* (2013.01); *B60G 2206/81012* (2013.01); *B60G 2401/17* (2013.01)

(58) Field of Classification Search
CPC ...... B60G 2206/81012; B60G 2401/17; B60G 2206/16; B60G 2204/422; F16C 11/0614; F16C 11/0695; F16C 2326/05
See application file for complete search history.

(56) References Cited

U.S. PATENT DOCUMENTS

| | | | |
|---|---|---|---|
| 8,038,162 B2 | 10/2011 | Knopp et al. | |
| 8,657,314 B2* | 2/2014 | Mosteiro Goyoaga | B60G 7/005 280/124.152 |
| 8,783,993 B2* | 7/2014 | Brunneke | F16F 1/3842 280/93.511 |
| 9,181,975 B2* | 11/2015 | Rechtien | F16C 23/045 |
| 9,476,448 B2* | 10/2016 | Jung | F16C 11/10 |
| 10,520,012 B1* | 12/2019 | McNeil | F16C 7/02 |
| 10,549,592 B2* | 2/2020 | Meyer | B29C 45/14336 |
| 11,279,191 B2 | 3/2022 | Holtheide et al. | |
| 2004/0067096 A1* | 4/2004 | Ersoy | B60G 7/005 403/137 |
| 2016/0075201 A1* | 3/2016 | Mosteiro Goyoaga | B23P 13/04 280/124.1 |
| 2017/0368552 A1* | 12/2017 | Plumb | F16C 11/0614 |
| 2019/0242428 A1* | 8/2019 | Sieve | F16C 11/0685 |
| 2021/0262517 A1* | 8/2021 | Bronswick | B60G 7/005 |
| 2021/0309061 A1* | 10/2021 | Sieve | F16C 43/00 |
| 2021/0323366 A1* | 10/2021 | Sieve | F16C 11/0695 |

FOREIGN PATENT DOCUMENTS

| | | | |
|---|---|---|---|
| DE | 101 10 738 C1 | 11/2002 | |
| DE | 10 2004 008 957 A1 | 9/2005 | |
| DE | 10 2004 039 781 A1 | 3/2006 | |
| DE | 10 2006 039 863 A1 | 3/2008 | |
| DE | 10 2013 002 285 A1 | 8/2014 | |
| DE | 10 2015 200 352 A1 | 7/2016 | |
| DE | 10 2017 208 410 B3 | 8/2018 | |
| DE | 102018210913 A1 * | 1/2020 | |
| DE | 102020206438 A1 * | 11/2021 | |
| EP | 1 329 343 A2 | 7/2003 | |
| EP | 1712379 A1 * | 10/2006 | B60G 7/001 |
| EP | 2 266 821 A1 | 12/2010 | |
| EP | 2 679 415 A1 | 1/2014 | |
| JP | 2006144945 A * | 6/2006 | |

OTHER PUBLICATIONS

Written Opinion Corresponding to PCT/EP2019/074638 dated Dec. 16, 2019.

German Office Action Corresponding to 10 2018 217 642.6 dated Feb. 16, 2022.

* cited by examiner

CHASSIS COMPONENT FOR A WHEEL SUSPENSION AND METHOD FOR PRODUCING A CHASSIS COMPONENT

This application is a National Stage completion of PCT/EP2019/074638 filed Sep. 16, 2019, which claims priority from German patent application serial no. 10 2018 217 642.6 filed Oct. 15, 2018.

FIELD OF THE INVENTION

The invention relates to a chassis component for a wheel suspension, comprising a strut arrangement having at least one strut which is in the form of a profile with an open cross-section shape, the at least one strut having a profile base and two wall sections extending away therefrom, wherein at least at one end of the strut an articulation point is provided for receiving two articulation joint components connected movably to one another, namely a first joint component comprising a spherical joint body and a second joint component in the form of a joint housing that holds the joint body in a rotatable and/or pivotable manner, wherein, in the area of the at least one articulation point, the wall sections have a first and a second joint accommodation aperture which are arranged opposite one another.

Furthermore, the invention relates to a method for producing a chassis component comprising a strut arrangement having at least one strut which is in the form of a profile with an open cross-section shape, wherein the at least one strut has a profile base and two wall sections extending away therefrom, wherein at least at one end of the strut an articulation point is provided for receiving two joint components connected movably to one another, namely a first joint component comprising a spherical joint body and a second joint component in the form of a joint housing that holds the joint body in a rotatable and/or pivotable manner, wherein in the area of the articulation point, the wall sections have a first joint accommodation aperture and a second joint accommodation aperture which are arranged opposite one another.

BACKGROUND OF THE INVENTION

A chassis component and a method for producing a chassis component of the above-mentioned type are known from DE 10 2013 002 285 A1. The production of the chassis component, in particular the fitting of the joint components connected movably to one another, entails much assembly effort and complexity. The profile component is a shaped sheet component that can be produced from a sheet semi-fabricate, itself the result of a previous cutting operation such as stamping.

SUMMARY OF THE INVENTION

Starting from the prior art described above, it is now the purpose of the present invention to provide a chassis component characterized by a simplification of the assembly process, in particular with improved process reliability during assembly.

From the device-technological standpoint this objective is achieved starting from the preamble of the independent claim(s) in combination with its characterizing features, and from the method-technological standpoint, the objective is achieved starting from the preamble of the independent claim(s) in combination with its characterizing features. The dependent claims that follow these in each case describe advantageous further developments of the invention.

According to the invention, a chassis component for a wheel suspension is proposed, which comprises a strut arrangement having at least one strut in the form of a profile with an open cross-section shape, such that the at least one strut has a profile base and two wall sections extending away therefrom, wherein at least at one end of the strut there is an articulation point for receiving two joint components connected movably to one another, namely a first joint component comprising a spherical joint body and a second joint component in the form of a joint housing that holds the joint body in a rotatable and/or pivotable manner, wherein, in the area of the at least one articulation point the wall sections have a first joint accommodation aperture and a second joint accommodation aperture arranged opposite one another. To simplify the assembly process, according to the invention it is provided that a cylindrical sleeve is pressed in between the first and the second joint accommodation apertures so as to keep the wall sections opposite one another spaced apart.

The sleeve pressed in between the first and the second joint accommodation apertures contributes toward imparting greater rigidity to the chassis component in this area. In addition, by virtue of the sleeve the profile component between the first joint accommodation aperture and the second joint accommodation aperture is brought to a necessary axial spacing measurement, in order to compensate for manufacturing tolerances during the production process of the profile. Furthermore, thanks to the pre-assembly undesired separating of the wall sections in the area of the at least one articulation joint during the overmolding process to produce the joint housing is prevented.

Preferably, at least one sensor element and the joint body can be inserted into the pressed-in sleeve, so that the sleeve, the at least one sensor element and the joint body are integrated in a joint housing produced by overmolding, which housing forms the second joint component.

Thus, the joint housing forming the second joint component holds the first joint component and the at least one sensor element during its production by overmolding. This eliminates the assembly step of pressing the first joint component into the joint housing. Likewise, an additional assembly step for arranging the at least one sensor element is eliminated. At the same time, the second joint component serves directly to provide a bearing for the spherical joint body constituting the first joint component, so that the use of a ball socket can be omitted.

A longitudinal axis can be associated with the sleeve, which also forms the longitudinal axis of the first joint component and the articulation point. A direction extending transversely to the longitudinal axis is in particular called a radial direction. A direction running around the longitudinal axis and/or a direction running in the circumferential direction of the sleeve or the first joint component is in particular called the circumferential direction.

Preferably, in its outer surface the sleeve has at least one opening that extends in sections in the circumferential direction, which helps with the insertion of the at least one sensor element. In that case the at least one sensor element can be inserted as far as the surface of the joint body. The size of the, in particular cylindrical, opening corresponds at least to the external dimensions of the sensor element. The joint accommodation apertures are preferably each in the form of a through-going opening in the sheet of the wall sections opposite one another. In each such opening an axial cut-out can be provided, whose shape corresponds to the shape of the opening in the outer surface of the sleeve.

In particular, the at least one sensor element can be designed to determine the relative position of the two joint components with respect to one another. The determination of the angular position of the two joint components can be used to determine a height. By means of the determined height, for example, a headlight range control can be carried out on the vehicle.

The at least one sensor element can be introduced directly as far as the surface of the joint body. Minimizing the radial distance between the sensor element and the surface of the joint body makes it possible to carry out various measurement processes for determining the angular position of the two joint components relative to one another.

According to a preferred embodiment the at least one sensor element can be in the form of a magneto-resistive sensor.

When the at least one sensor element is in the form of a magneto-resistive sensor, a position magnet can be set into a recess on the surface of the joint body and is associated with the sensor element. The omission of a ball socket thanks to the direct fitting of the joint body in the joint housing made by overmolding makes it possible to minimize the distance between the sensor element and the position magnet. Preferably, a radial distance between the surface of the position magnet and the sensor head is less than 1 mm; particularly preferably a distance of about 0.5 mm or less can be achieved.

In a preferred further development, the sensor can be designed to seal the recess and the position magnet arranged therein. During the overmolding to produce the joint housing this can prevent material from making its way into the recess and between the position magnet and the sensor element. To seal the recess, a cover element can be provided on the sensor element which is positioned over the recess. The cover element preferably has a contour that corresponds with the shape of the recess. Thus, the cover element can overlap the edges of the recess and cover it completely. The sensor element with the cover element are positioned on the surface of the joint body before the overmolding operation. The sensor element is orientated perpendicularly to the recess in the joint body, so that the cover element can seal the recess completely.

A further advantage of forming the joint housing as the direct bearing element of the joint body is that alternative sensor versions can be used. The design according to the invention, with the joint housing formed by overmolding on the joint body of the first joint component, makes it possible to use a sensor element in the form of an incremental transducer as an alternative to the use of a magneto-resistive sensor element.

Preferably, the sensor element made as an incremental transducer can be designed for photoelectric scanning or for magnetic scanning. In the case of an incremental transducer designed for photoelectric scanning, this can work in accordance with an imaging measurement principle or an interferential measurement principle. The intervention in the surface of the joint body can be minimized by using a sensor element in the form of an incremental transducer. In particular the recess on the surface of the joint body, which serves to receive the position magnet, can be omitted. Moreover, the joint body can be inserted into the sleeve without the need to maintain a specific position of the surface of the joint body relative to the sensor element. This simplifies the introduction of the first joint component into the sleeve before the overmolding process.

Preferably, a measuring standard running circumferential direction can be provided on the surface of the joint body. The measuring standard is designed in accordance with the form of the incremental transducer or the measuring principle it uses. The measuring standard can essentially be in the form of a strip or band. At least in sections, the measuring standard can extend in the circumferential direction over the surface of the joint body. An advantage of this is that the measurement standard can in a way be fixed onto or into the joint body in such manner that it produces almost no irregularities or none at all on the surface of the joint body. The at least one sensor element can be positioned with a radial clearance reduced even more than is possible with a magneto-resistive sensor, in particular when at the same time it serves to seal the recess of the position magnet.

Preferably, the measurement standard can be in the form of a magnet wheel, a magnetic strip or a barcode. For example, a magnetic strip can be set into a groove made on the surface of the joint body. It is also conceivable to bond the magnetic strip or the magnet wheel onto the surface of the joint body. A measurement standard in the form of a barcode can also be set into a groove or bonded to the surface of the joint body. The depth of the groove can then be chosen such that the measurement standard is almost or completely flush with the adjacent area of the running surface. Moreover, the essentially strip-shaped or band-shaped barcode can at least in sections be worked in around the surface of the joint body by knurling, engraving or laser etching. Compared with the depth of the recess for the position magnet the depth of the groove is much smaller, so that the joint body is weakened less thereby.

In particular, the first joint component and the second joint component can be part of a ball sleeve joint.

Preferably, the chassis component can be a linkage, in particular a transverse control arm.

Furthermore, the initially stated objective is achieved by a method for producing a chassis component, which method has the characteristics specified in the independent claim(s).

According to the independent claim(s), a method for producing a chassis component is proposed, which component comprises a strut arrangement with at least one strut made as a profile with an open cross-section, wherein the at least one strut has a profile base and two wall sections extending away therefrom, wherein at least at one end of the strut an articulation point is provided for receiving two joint components connected movably to one another, namely a first joint component with a spherical joint body and a second joint component that holds the joint body rotatably and/or pivotably, wherein in the area of the at least one articulation point the wall sections have a first joint accommodation aperture and a second joint accommodation aperture, and between the first joint accommodation aperture and the second joint accommodation aperture a cylindrical sleeve is pressed in, which sleeve keeps the wall sections opposite one another apart from one another.

Preferably, at least one sensor element and the joint body are inserted into the pressed-in sleeve, and the sleeve with the at least one sensor element and the joint body are then integrated in a joint housing produced by overmolding, which housing forms the second joint component.

Thanks to the method according to the invention the number of assembly steps required is reduced. In particular, by virtue of the sleeve, the part of the profile between the first joint accommodation aperture and the second joint accommodation aperture is brought to a required axial distance measurement in order to compensate for manufacturing tolerances in the production process of the profile component. Furthermore, due to the pre-assembly of the sleeve undesired separating of the wall sections in the area of the at least one articulation point during the overmolding to produce the joint housing is prevented.

BRIEF DESCRIPTION OF THE DRAWINGS

Advantageous embodiments of the invention, which will be explained below, are illustrated in the drawings, which show.

DETAILED DESCRIPTION OF THE PREFERRED EMBODIMENTS

Figure 1:
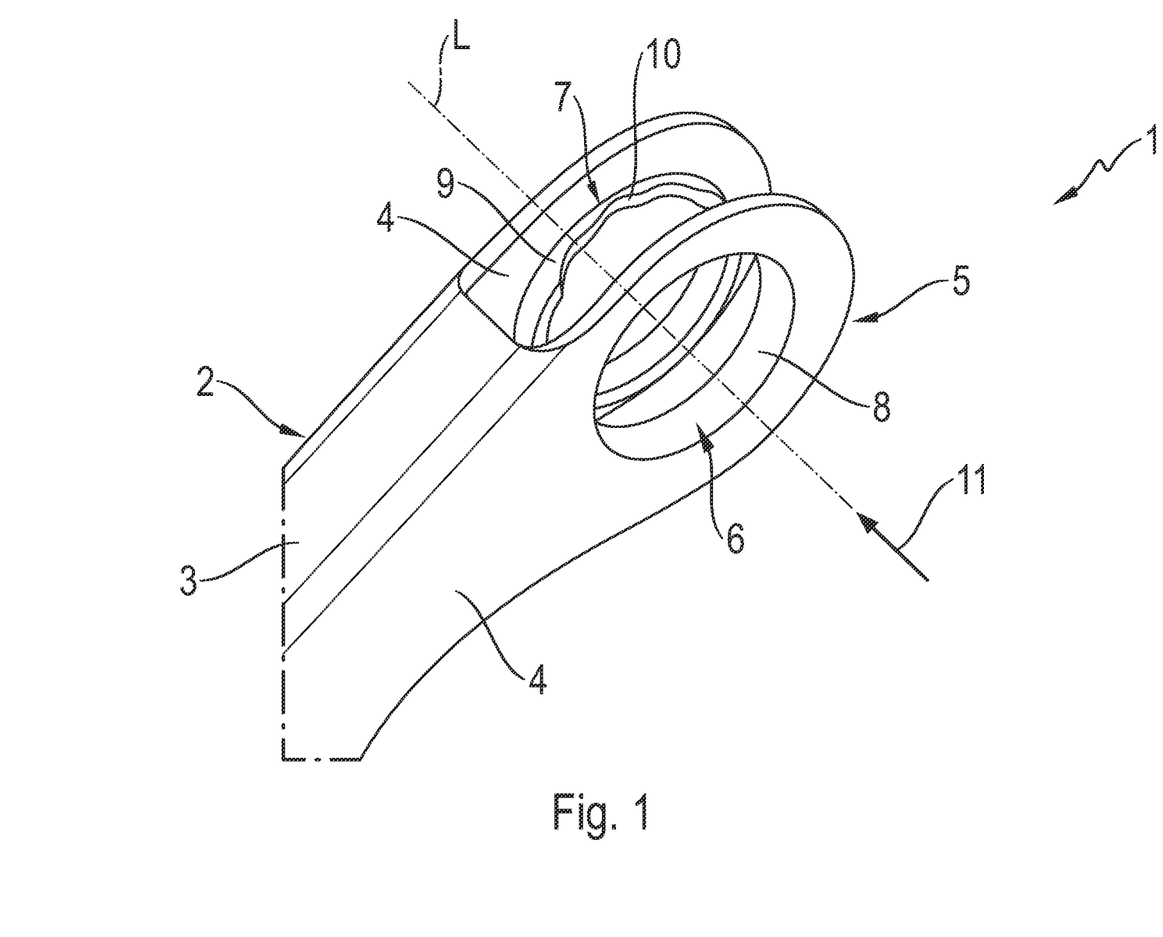
FIG. 1: A partial perspective view of a profiled chassis component.

FIG. 1 shows a partial perspective view of a profiled chassis component 1. In the example embodiment shown the chassis component 1 is in the form of a two-point link or a transverse control arm. The chassis component 1 comprises a strut arrangement with at least one strut 2, which is in the form of a profile component with an open cross-section. The profile component is a shaped sheet part that can be produced from a sheet semifabricate obtained in a previous cutting step, in particular by stamping. The at least one strut 2 has a profile base 3 and two wall sections 4 that extend away therefrom. At least in sections the profile component can have an essentially U-shaped cross-section. At least at one end of the strut 2, an articulation point 5 is provided for receiving two joint components connected movably to one another.

At the articulation point 5, the strut 2 has a first joint accommodation aperture 6 and a second joint accommodation aperture 7. A longitudinal axis L is associated with the articulation point 5. A direction extending transversely to the longitudinal axis L or transversely to the axial direction 11 is in particular called a radial direction. Preferably, the joint accommodation apertures 6 and 7 are in each case in the form of through-going openings 8 and 9 in the sheet of the two wall sections 4. In this case the free edges of the through-going openings 8 and 9 of the wall sections 4 of the chassis component 1 are directed inward toward the inside of the profile. As viewed in the circumferential direction the openings 8, 9 of the first joint accommodation aperture 6 and the second joint accommodation aperture 7 have an almost closed outer surface. The openings 8, 9 are in each case interrupted at one point by an axial cut-out 10; in the illustration of FIG. 1, due to the perspective representation only the cut-out 10 in the opening 9 of second joint accommodation aperture 7 can be seen. The cut-out 10 in the opening 8 of the first joint accommodation aperture 6 is made symmetrically thereto.

Figure 2:
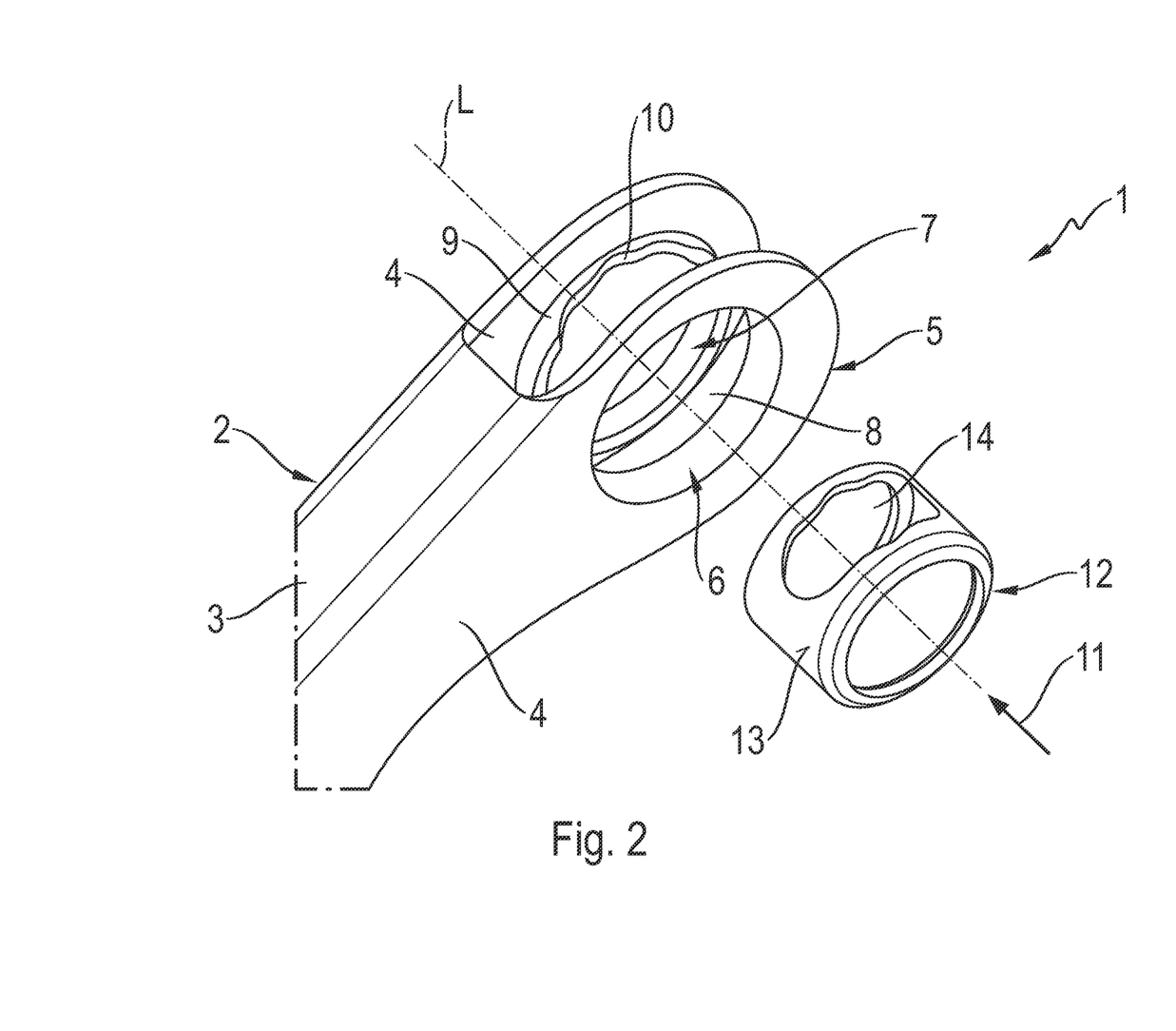
FIG. 2: A partial perspective view as in FIG. 1, with a sleeve that is to be inserted into the profiled chassis component.

FIG. 2 shows a partial perspective view like that of FIG. 1 with a sleeve 12 which is to be inserted into the profile chassis component 1. The sleeve 12 is cylindrical with an essentially circular cross-section, and has an outer surface 13. In the outer surface 13 of the sleeve 12 at least one cylindrical opening 14 is arranged. The opening 14 extends in sections in the circumferential direction of the sleeve 12. The contour of the opening 14 in the circumferential direction of the sleeve 12 corresponds essentially to the respective contours of the recesses in the openings 8, 9. The sleeve 12 is inserted in the axial direction 11 into the articulation point 5 and pressed in between the wall sections 4. In that way, the tolerance-affected profile component is brought to the correct size in relation to the axial distance between the first and second joint accommodation apertures 6, 7. In addition the rigidity of the profile component in the area of the articulation point 5 is increased. The sleeve 12 is preferably made of metal.

Figure 3:
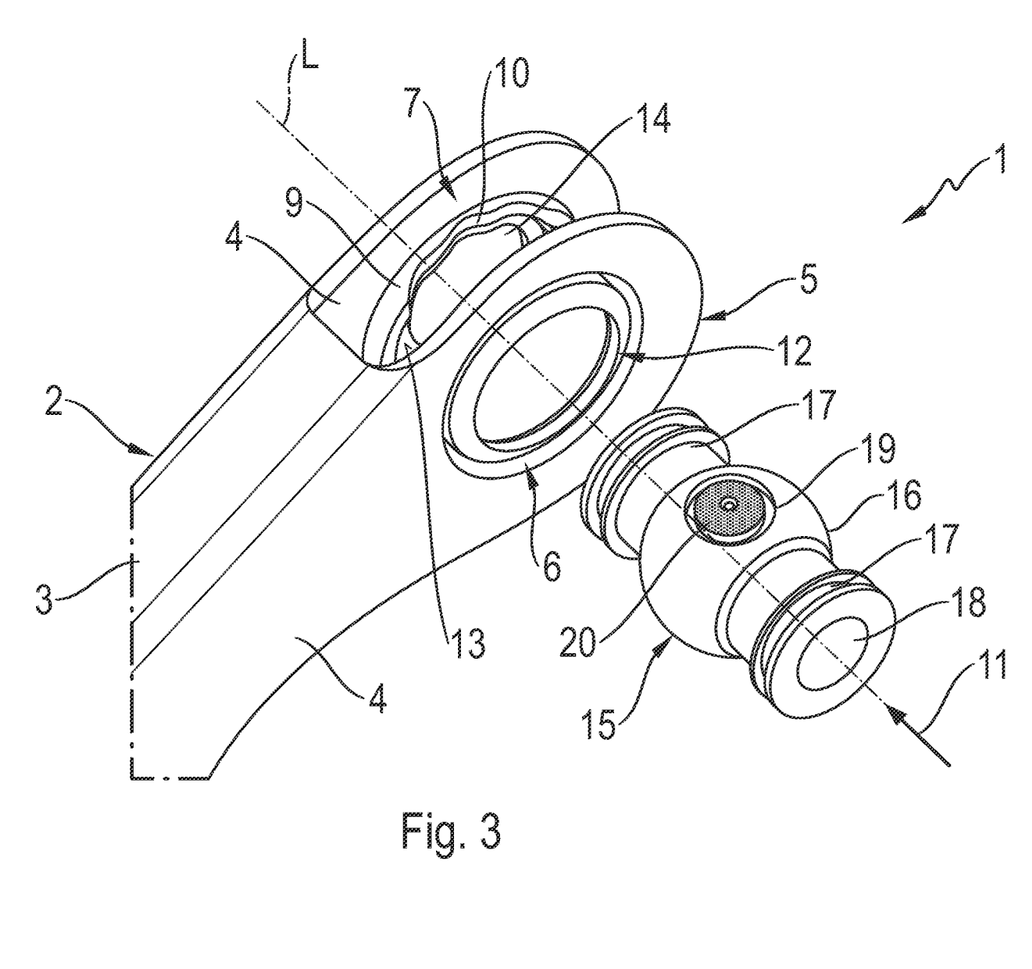
FIG. 3: A partial perspective view of the chassis component as in FIG. 2, with the sleeve pressed in and a first joint component that is to be inserted.

FIG. 3 shows a partial perspective view of the chassis component 1 shown in FIG. 2 with the sleeve 12 pressed in and a first joint component 15 that is to be inserted into the sleeve 12. The first joint component 15 has a spherical joint body 16, at each end of which a cylindrical protrusion 17 is arranged, these extending coaxially with respect to the longitudinal axis L. The joint body 16 and the protrusions 17 have a through-going bore 18 also coaxial with the longitudinal axis L. On the surface of the joint body 16 a circular-cylindrical recess 19 is provided, in which a position magnet 20 is set. The first joint component 15 is inserted into the sleeve 12 in the axial direction 11. During this the joint component 15 is positioned in such manner that the recess 19 and the position magnet 20 are essentially under the opening 14 in the sleeve 12, so that they are freely accessible in the radial direction. The first joint component 15 is preferably made of metal.

Figure 4:
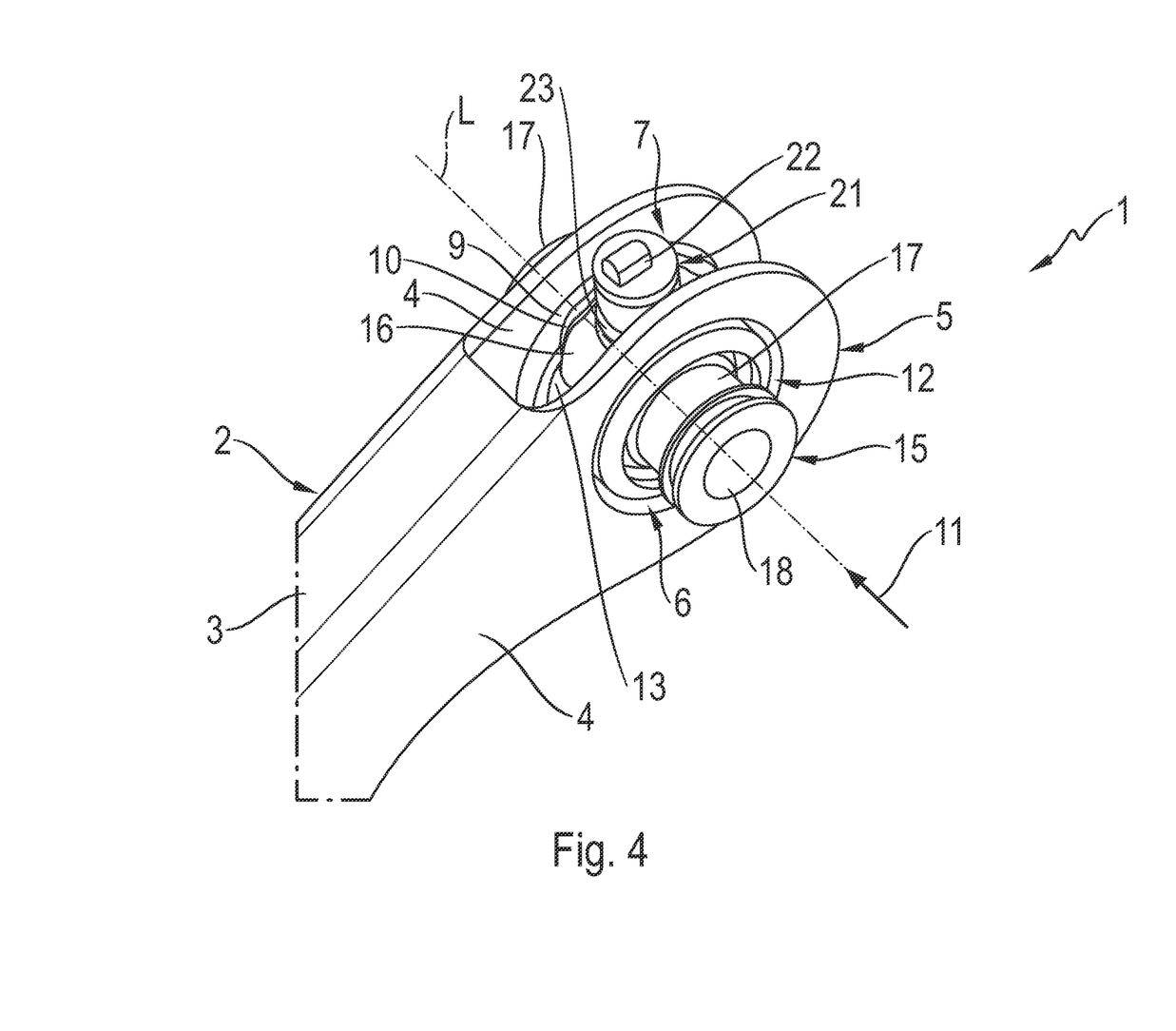
FIG. 4: A partial perspective view of the chassis component as in FIG. 3, with the first joint component and a sensor element inserted in the sleeve.

FIG. 4 shows a partial perspective view of the chassis component 1 according to FIG. 3, with the first joint component 15 and a sensor element 21 inserted into the sleeve 12. The sensor element 21 is in the form of a magneto-resistive sensor which is associated with the position magnet 20. The sensor element 21 is inserted from the outside through the cut-out 10 in the through-going openings and the correspondingly formed opening 14 in the sleeve 12, as far as the surface of the joint body 16. The sensor element 21 is directed perpendicularly to the position magnet 20. At its free end the sensor element 21 has a connector 22 for connection to a signal line 26. At the opposite end of the sensor element 21 a cover element 23 is arranged. The cover element 23 is positioned over the recess 19 in the joint body 16, so that it covers the recess 19 completely. The radial distance between the sensor head of the sensor element 21 and the position magnet 20 is determined by the material thickness of the cover element 23 in this area. In particular, the radial distance is less than 1 mm and particularly preferably the radial distance can be approximately 0.5 mm.

Figure 5:
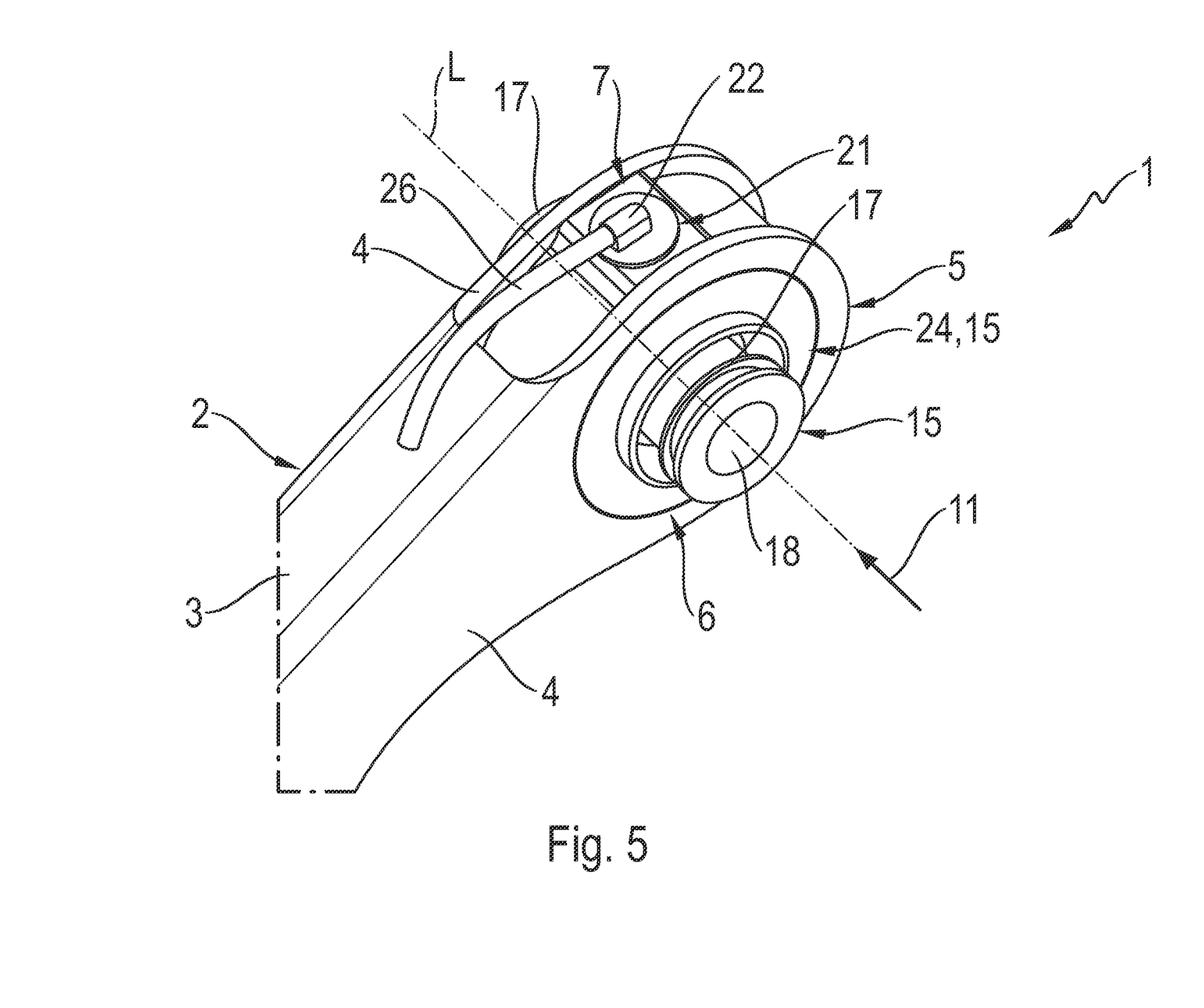
FIG. 5: A partial perspective view of the chassis component as in FIG. 4, with a second joint component made by overmolding.

FIG. 5 shows a partial perspective view of the chassis component 1 as in FIG. 4, with a second joint component 24 made by overmolding. The second joint component 24 is in the form of a joint housing 25 in which the joint body 16 is directly fitted. The at least sectional overmolding of the first joint component 15, the sensor element 21 and the sleeve 12 between and on the outsides of the wall sections 4 at the articulation point 5 takes place by an assembly injection molding process. Separating of the wall sections 4 in the area of the at least one articulation point 5 during the overmolding to produce the joint housing 25 is prevented by the sleeve 12. By way of the cover element 23, the imperfect area, the recess 19, in the surface of the joint body 16 is sealed against the penetration of material during the injection molding process. This enables the prior arrangement of a ball socket on the joint body 16 to be omitted, which socket usually covers the imperfection and serves to mount the joint body in the joint housing. The signal line 26 is connected to the connector 22 of the sensor element 21, by way of which line the signals produced by the sensor element 21 can be sent to a superordinated control device of a vehicle in which the chassis component 1 is fitted.

Figure 6:
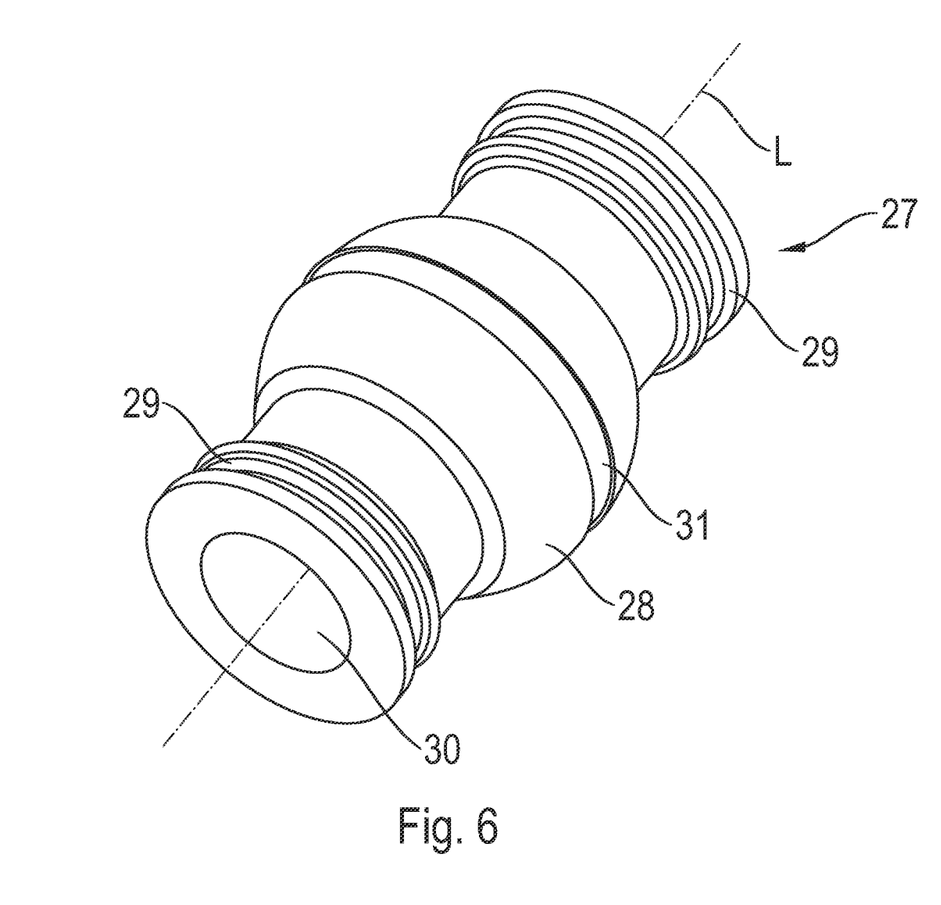
FIG. 6: A perspective view of a first joint component according to a further embodiment.

The illustration in FIG. 6 shows a perspective view of a first joint component 27 according to an alternative embodiment. This first joint component 27 has two protrusions 29 and a spherical joint body 28 between them. The first joint component 27 is made of metal. Instead of a recess for receiving a position magnet the joint body 28 has an annular groove 31 on its surface, in which a measurement standard is arranged.

Figure 7:
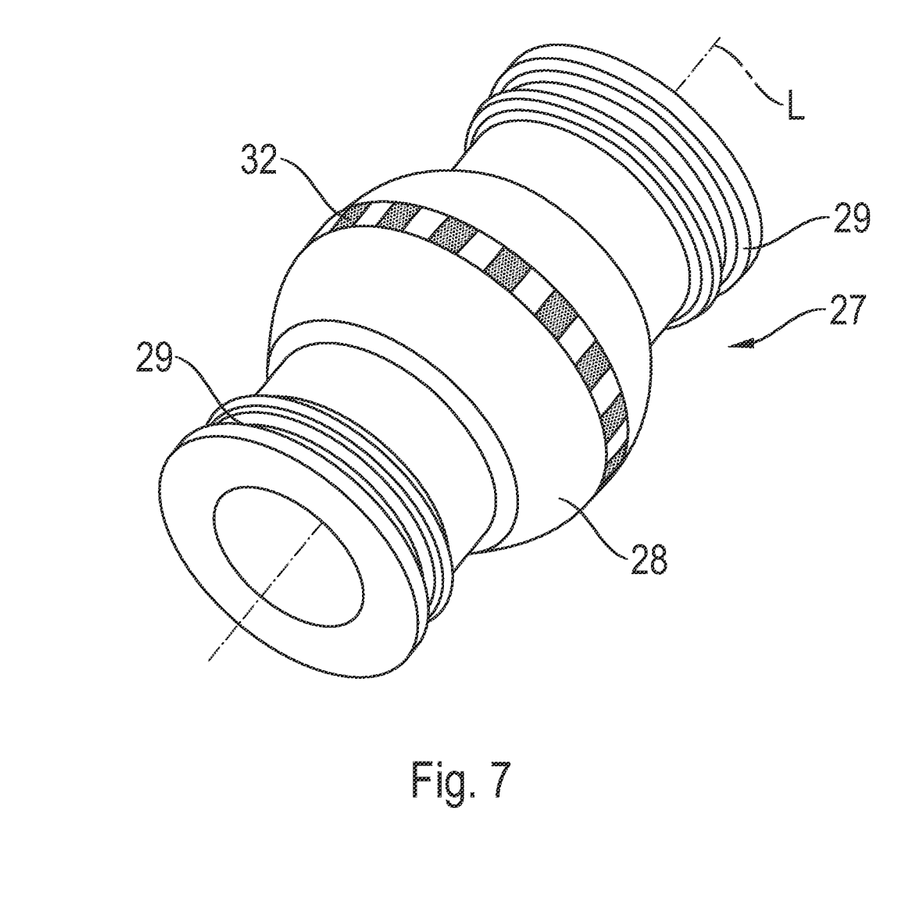
FIG. 7: A perspective view of the first joint component as in FIG. 6, with a measurement standard arranged on it.

FIG. 7 shows a perspective view of the first joint component 27 according to FIG. 6 with a measurement standard 32 arranged on it. The measurement standard 32 is set into the groove 31. As can be seen in the drawing, the annular groove 31 in the joint body 28 can be filled by the measurement standard 32 in such manner that virtually no imperfections occur on the surface of the joint body 28.

Figure 8:
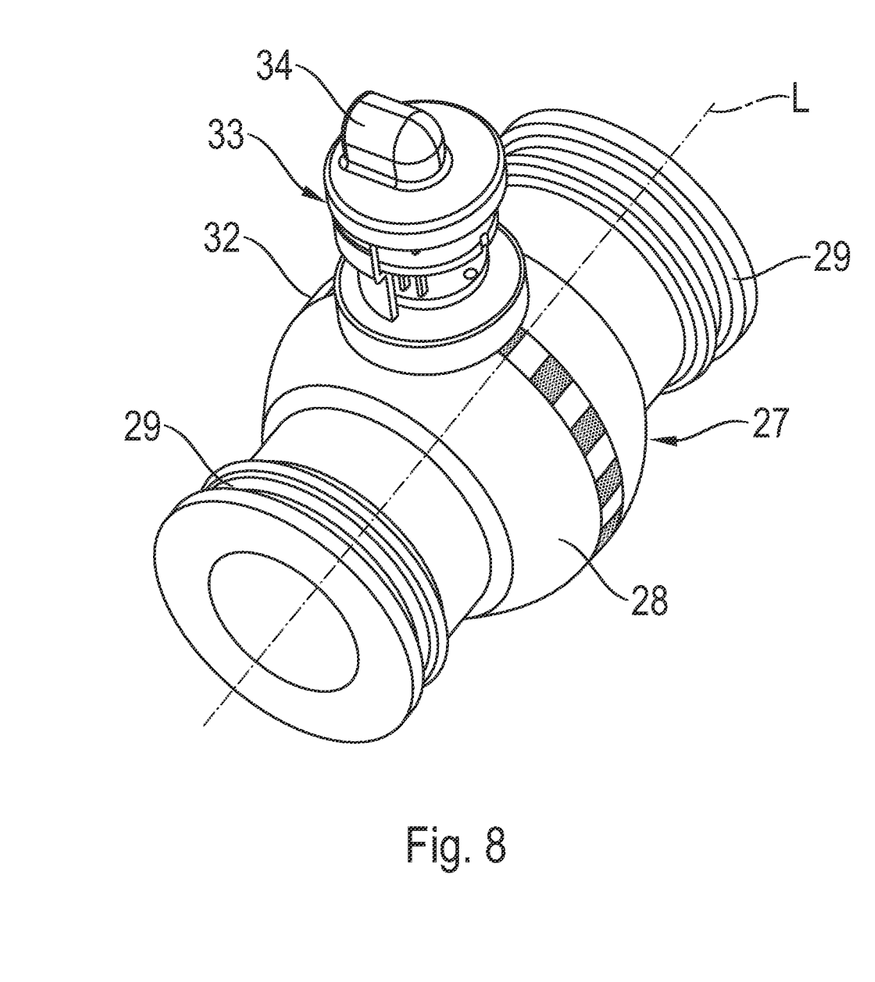
FIG. 8: A perspective view of the first joint component as in FIG. 7, with a sensor element associated therewith.

FIG. 8 shows a perspective view of the first joint component 27 according to FIG. 7 with the at least one sensor element 33 positioned relative to the joint body 28 and the measurement standard 32. At its free end the sensor element 33 has a connector 34 for connection to a signal line. The sensor element 33 can be positioned a minimal distance away from the surface of the joint body 28, before at least the joint body 28 of the first joint component 27 and the sensor element 33 are integrated in the joint housing 25 produced by overmolding. In this case the arrangement of the joint body 28 in the sleeve 12 before the overmolding is independent of any specific positioning of the surface of the joint body 28 relative to the sensor element 33, as is the case when the sensor element 21 is in the form of a magneto-resistive sensor.

In this embodiment the at least one sensor element 33, which is integrated in the joint housing 25 by overmolding, is in the form of an incremental transducer. For this, the at least one sensor element 33 in the form of an incremental transducer can be designed for magnetic scanning or for photoelectric scanning. The measurement standard 32 necessary for this can be a magnet wheel, a magnetic strip or a barcode. In the example embodiment shown, the measurement standard 32 is arranged in the annular groove 31 on the surface of the joint body 28. The groove extends coaxially with the longitudinal axis L in the area of the largest outer diameter of the joint body 28. Compared with the recess 19 for the position magnet 20 in the joint body 16 according to the first embodiment, the depth of the groove 31 is much smaller, so that the joint body 28 is weakened less.

A design of the measurement standard 32 as a barcode can be produced on the surface of the joint body 28 by knurling, engraving or laser etching. Likewise, a barcode can be formed in the groove 31. In the simplest case, a barcode can be bonded onto the joint body 28. In this design of the measurement standard 32 too, the effect on the surface contour of the joint body 28 is only minimal.

INDEXES

1 Chassis component
2 Strut
3 Profile base
4 Wall section
5 Articulation point
6 Joint accommodation aperture
7 Joint accommodation aperture
8 Opening
9 Opening
10 Cut-out
11 Axial direction
12 Sleeve
13 Outer surface of 12
14 Opening
15 First joint component
16 Joint body
17 Protrusion
18 Through-going bore
19 Recess
20 Position magnet
21 Sensor element
22 Connector
23 Cover element
24 Second joint component
25 Joint housing
26 Signal line
27 First joint component
28 Joint body
29 Protrusion
30 Through-going bore
31 Groove
32 Measurement standard
33 Sensor element
34 Connector
L Longitudinal axis

The invention claimed is:

1. A chassis component for a wheel suspension, the chassis component comprising:
   a strut arrangement having at least one strut, which is in a form of a profile component with an open cross-section,
   the at least one strut having a profile base and two wall sections extending away therefrom,
   an articulation point being provided, at least at one end of the strut, for receiving first and second joint components that are movably connected to one another,
   the first joint component having a spherical joint body and the second joint component at least one of rotatably and pivotably holding the joint body,
   the two wall sections, in an area of the at least one articulation point, having a first joint accommodation aperture and a second joint accommodation aperture, respectively, arranged opposite one another,
   a cylindrical sleeve being pressed in between the first joint accommodation aperture and the second joint accommodation aperture,
   the sleeve keeping the oppositely arranged two wall sections apart from one another, and
   at least one sensor element and the joint body are inserted into the sleeve, and the sleeve, the sensor element and the joint body inserted therein are integrated in a joint housing produced by overmolding, and the housing forms the second joint component.

2. The chassis component according to claim 1, wherein an outer surface of the sleeve has an opening which extends, at least in sections, in a circumferential direction, and the opening facilitates insertion of the at least one sensor element.

3. The chassis component according to claim 1, wherein the at least one sensor element is designed to determine positions of the first and the second joint components relative to one another.

4. The chassis component according to claim 1, wherein the at least one sensor element is inserted directly to a surface of the joint body.

5. The chassis component according to claim 1, wherein the at least one sensor element is in a form of a magneto-resistive sensor.

6. The chassis component according to claim 5, wherein a position magnet, associated with the sensor element, is set into a recess in a surface of the joint body.

7. The chassis component according to claim 6, wherein the sensor element is designed to seal the recess and the position magnet arranged therein.

8. The chassis component according to claim 1, wherein the sensor element is in a form of an incremental transducer.

9. The chassis component according to claim 8, wherein the sensor element, in the form of the incremental transducer, is designed for photoelectric scanning or for magnetic scanning.

10. The chassis component according to claim 8, wherein a measurement standard, in a circumferential direction, is provided on a surface of the joint body.

11. The chassis component according to claim 10, wherein the measurement standard is in a form of one of a magnetic strip or a barcode.

12. The chassis component according to claim 1, wherein the first joint component and the second joint component are parts of a ball sleeve joint, and the chassis component is a transverse control arm.

13. A method of producing a chassis component for a wheel suspension, the chassis component having a strut arrangement with at least one strut, which is in a form of a profile component with an open cross-section, the at least one strut has a profile base and two wall sections extending away from the profile base, an articulation point is provided, at least at one end of the strut, for receiving first and second joint components movably connected to one another, the first joint component has a spherical joint body and the second joint component at least one of rotatably and pivotably holds the joint body, the two wall sections have, in an area of the at least one articulation point, a first joint accommodation aperture and a second joint accommodation aperture arranged opposite one another, the method comprising;
pressing a cylindrical sleeve in between the first joint accommodation aperture and the second joint accommodation aperture, and
using the sleeve to keep the oppositely arranged two wall sections apart from one another, and
inserting at least one sensor element and the joint body into the sleeve, and
integrating the sleeve, the at least one sensor element and the joint body in a joint housing produced by overmolding, which housing forms the second joint component.

14. A chassis component for a wheel suspension, the chassis com prising:
a strut arrangement having at least one strut, the strut having a profile with an open cross-section, the strut comprising a profile base and first and second wall sections that extend away from the profile base,
at least one end of the strut has an articulation point which receives first and second joint components that are movably connected to one another, the first joint component has a spherical joint body, and the second joint component retains the joint body such that the joint body is at least one of rotatable and pivotable relative to the second joint component,
in an area of the at least one articulation point, the first wall section has a first joint accommodation aperture and the second wall section has a second joint accommodation aperture, and the first and the second joint accommodation apertures are arranged opposite one another,
a cylindrical sleeve is pressed in between the first and the second joint accommodation apertures such that the sleeve maintains separation of the first and the second wall sections at a set distance from one another, and
at least one sensor element and the joint body are inserted into the sleeve, and the sleeve, the sensor element and the joint body inserted therein are integrated in a joint housing produced by overmolding, and the housing forms the second joint component.

* * * * *